United States Patent [19]
Takada et al.

[11] Patent Number: 5,956,952
[45] Date of Patent: Sep. 28, 1999

[54] CHARGE PUMP FOR A HYDROSTATIC TRANSMISSION

[75] Inventors: Kenichi Takada; Ryota Ohashi, both of Amagasaki, Japan

[73] Assignee: Kanzaki Kokyukoki Mfg. Co., Ltd, Japan

[21] Appl. No.: 08/867,534

[22] Filed: Jun. 2, 1997

Related U.S. Application Data

[63] Continuation-in-part of application No. 08/665,575, Jun. 18, 1996, Pat. No. 5,713,203.

[51] Int. Cl.⁶ .................................................... F16D 31/02
[52] U.S. Cl. .................................. 60/468; 60/488; 91/441
[58] Field of Search ........................ 60/488, 468; 91/441

[56] References Cited

U.S. PATENT DOCUMENTS

| | | | |
|---|---|---|---|
| 4,891,944 | 1/1990 | Okuda et al. .............................. | 60/488 |
| 5,031,403 | 7/1991 | Okada ........................................ | 60/487 |
| 5,311,740 | 5/1994 | Shiba et al. ................................ | 60/488 |
| 5,412,948 | 5/1995 | Komura et al. ............................ | 60/468 |
| 5,546,752 | 8/1996 | Horton et al. ............................. | 60/468 |
| 5,613,409 | 3/1997 | Hauser ...................................... | 60/488 |
| 5,701,739 | 12/1997 | Ohashi et al. ............................. | 60/488 |

FOREIGN PATENT DOCUMENTS 6-12276  6/1994  Japan .

*Primary Examiner*—Sheldon J. Richter
*Attorney, Agent, or Firm*—Sterne, Kessler, Goldstein & Fox P.L.L.C.

[57] ABSTRACT

A charge pump for a hydrostatic transmission, having a self-charge relief function, in which a first toothed wheel, a second toothed wheel, and a pump casing, housing therein the first and second toothed wheels, are molded of heat resistant resin material, thereby reducing the weight of the charge pump, stabilizing its charge relief function and reducing the wear of the lower surface of a center section. Check valves are housed in the pump casing so that operating oil sealed between a hydraulic pump and a hydraulic motor can always be maintained at a proper level, regardless of whether the charge pump is driven or not.

15 Claims, 11 Drawing Sheets

CHARGE PUMP FOR A HYDROSTATIC TRANSMISSION

REFERENCE TO RELATED APPLICATION

This application is a Continuation-in-Part of application Ser. No. 08/665,575; filed Jun. 18, 1996, now U.S. Pat. No. 5,713,203.

BACKGROUND OF THE INVENTION

1. Field of the Invention

The present invention relates to an axle driving apparatus equipped with a hydrostatic transmission, and more particularly to a charge pump for feeding pressurized oil into a closed circuit of the hydrostatic transmission. The charge pump is reduced in weight and has improved durability.

2. Related Art

Conventionally, it is a well-known technique for a charge pump to be integrally attached to a hydrostatic transmission (hereinafter referred to as an HST) in order to feed pressurized oil thereto. Said technique has been proposed by this applicant in U.S. Pat. No. 5,031,403, in which the charge pump is bolted onto the lower horizontal surface of the center section of the HST.

When operating oil, circulating between a hydraulic pump and a hydraulic motor, both mounted onto the center section, is fed by the charge pump, the incorporation of a charge relief valve into the center section is required in order to maintain the proper feed oil pressure. Therefore, this applicant, by eliminating this exclusive charge relief valve, has further improved the above-mentioned technique, as proposed in Japanese Utility Model Publication No. Hei-6-12276.

In the above-mentioned invention, the casing of the charge pump is not fixed to the lower horizontal surface of the center section, but is pressed to the lower surface thereof so that the discharge port of the charge pump is closely connected with the supply port of the center section. When the pressure of the oil discharged from the charge pump exceeds the biasing force of a spring, the entire charge pump leaves the lower horizontal surface of the center section, the discharge pump temporarily disconnects from the supply port of the charge pump, and the oil pressure discharged from the discharge pump is adjusted corresponding to the biasing force of the spring. In effect, the charge pump itself functions as the charge relief valve.

The charge pump comprises three parts: an inner rotor, an outer rotor and a pump casing. They are wrought of metal, such as iron, or molded of metal from the iron family such as sintered metal, superior in productivity and generally larger in weight, causing damping to decrease when the charge pump is under relief operation, and resulting in instable relief performance. When the center section, made of aluminum, is struck at the lower horizontal surface by the charge pump made of iron, there is concern that the lower surface will wear after long use.

When the HST is used for driving axles of the vehicle and the vehicle is parked on a slope with the engine stopped, the charge pump is not driven and the hydraulic motor is subjected to a load, causing the wheels to rotate, and pumping the operating oil circulating in the closed circuit of the center section. Thus, in the state where the operating oil in the closed circuit is under pressure, with the lapse of time, the oil leaks from a sliding portion of each piston in a cylinder block or a slidably rotating portion thereof. When negative pressure develops in the closed circuit, small quantities of air in the operating oil expand to naturally rotate the hydraulic motor, allowing the vehicle to roll away along the slope.

SUMMARY OF THE INVENTION

An object of the present invention is to commonly house a hydrostatic transmission (HST) including a hydraulic pump, a hydraulic motor and a center section on which the hydraulic pump and hydraulic motor are disposed. Additionally, a separate charge pump is disposed on one surface of the center section and is provided with a first toothed wheel, not-relative-rotatably and axially slidable, connected to the lower end of a power input shaft, and a second toothed wheel engageable with the first toothed wheel, and a pump casing for containing therein the first and second toothed wheels. The pump casing is pressed onto one surface of the center section by biasing means so as to provide a self charge relief function. The first toothed wheel, second toothed wheel, and pump casing are molded of a heat resistant resin material. The charge pump is made of resin material to reduce its weight. The pump casing is reduced in weight, so that the damping is enlarged, allowing the charge relief function to be stabilized. Also, the first toothed wheel and second toothed wheel are made from resin in order to restrain the wear on the one surface of the center section which is in contact with the first and second toothed wheels.

Another object of the invention is that the operating oil sealed between the hydraulic pump and the hydraulic motor is adapted to always be maintained in a proper amount regardless of whether the charge pump is being driven, thereby preventing the vehicle from unexpected runaway.

Other objects and advantages of the present invention will appear more clearly from the following detailed description and examples which follow.

DETAILED DESCRIPTION OF THE PREFERRED EMBODIMENTS

Figure 1:
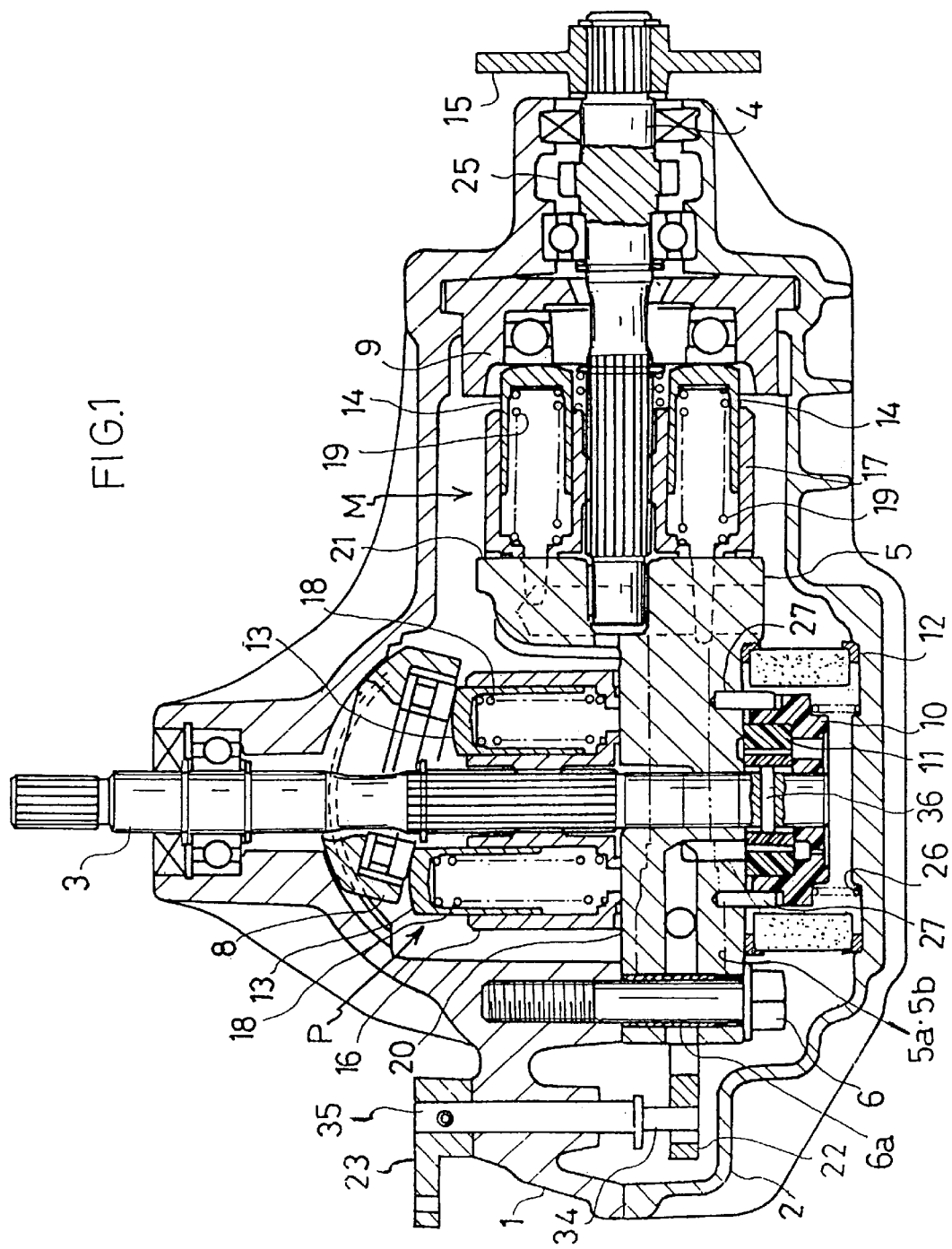
FIG. 1 is a cross-sectional view of an axle driving apparatus of the invention.

Next, explanation will be given on construction of an axle driving apparatus in accordance with FIG. 1 in which a housing is comprised of an upper half casing 1 and a lower half casing 2, which are coupled with each other at a joint surface. A hydrostatic transmission (HST) is housed in the housing, and oil is provided therein, so as to form an oil sump.

Affixed to upper half casing 1, by bolts 6, is a center section 5 which is substantially L-like shaped when viewed in lateral cross-section. A pump mounting surface 20 is formed on an upper horizontal surface of center section 5. A cylinder block 16 is rotatably disposed on pump mounting surface 20 forming a hydraulic pump P. A plurality of pistons 13 are inserted into a plurality of cylinder bores in cylinder block 16 and are biased by springs 18 permitting them to freely advance and retreat. A thrust bearing, held to a movable swash plate 8, abuts at the lower surface thereof against the heads of pistons 13. An input shaft 3, serving as a pump shaft, engages with cylinder block 16 at the axis of rotation thereof. The axis of rotation of input shaft 3 vertically extends and is supported at the upper end by upper half casing 1 and at the lower end by center section 5. The upper end of input shaft 3 extends beyond and projects outside of upper half casing 1 and is fixed with an input pulley (not shown), so that power can be inputted into the housing from an engine or the like through a belt.

On a vertical side surface of center section 5 is formed a motor mounting surface 21. A cylinder block 17 is rotatably disposed on the motor mounting surface 21, constituting a hydraulic motor M. A plurality of pistons 14 are inserted into a plurality of cylinder bores in cylinder block 17 and are biased by springs 19 permitting them to freely advance and retreat. A thrust bearing held to a fixed swash plate 9, which is sandwiched between upper half casing 1 and lower half casing 2, abuts the heads of pistons 14. A motor shaft 4 engages with cylinder block 17 at the axis of rotation thereof. A bearing for motor shaft 4 is formed at the joint surface of upper and lower half casings 1 and 2. A pair of left and right axles (not shown) are contained in the housing. A gear 25 is provided on motor shaft 4 and is connected with the axles through a power transmitting mechanism or the like. Motor shaft 4 projects, at the utmost end thereof, outside of the housing. A brake disc 15 for braking the axle is fixed onto motor shaft 4.

Figure 2:
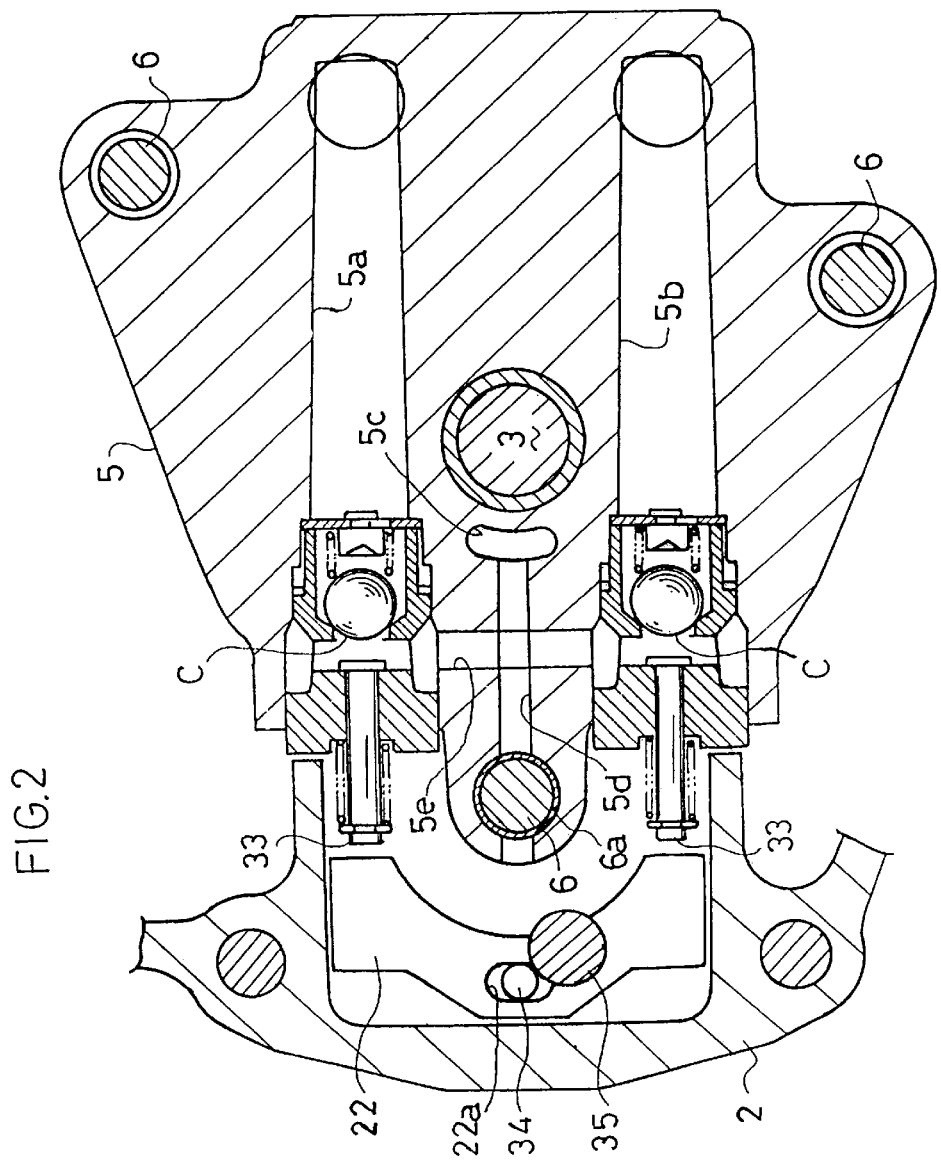
FIG. 2 is a cross-sectional view of a center section of the same.

In center section 5, a pair of oil passages 5a and 5b are bored in parallel to each other, as shown in FIG. 2. These passages connect a pair of kidney ports open on pump mounting surface 20 and a pair of kidney ports open at motor mounting surface 21, thereby constituting a closed circuit through which the operating oil circulates between hydraulic pump P and hydraulic motor M. Check valves C for supplying operating oil are disposed at each opening of oil passages 5a and 5b.

An operating oil supply port 5c is open at the lower horizontal surface of center section 5 and communicates with the discharge port of a charge pump 11, to be hereinafter discussed. In center section 5, operating oil supply port 5c communicates with oil passages 5d and 5e, which are horizontally bored and cross perpendicularly to each other. Oil passages 5d and 5e communicate with the inlet ports of check valves C. The opening end of oil passage 5d is closed by a sleeve 6a, having an insertion bore for bolt 6.

Movable swash plate 8 is connected in association with a speed changing member, such as a lever or a pedal, provided on the vehicle, and is operated by laterally inclining it from the neutral position. This allows the discharge amount and the discharge direction of the oil discharged from hydraulic pump P to be changed and sends operating oil to hydraulic motor M through the closed circuit in center section 5. The hydrostatic transmission is constructed such that stepless output rotation can be obtained by motor shaft 4 of hydraulic motor M.

Check valves C are provided with push pins 33 for communicating the inlet side of center section 5 with the outlet side. Push pins 33 are biased at the utmost ends by springs and project in parallel with each other outwardly from center section 5 and are opposite to a by-pass operating member 22. A slot 22a is open at the by-pass operating member 22, into which a cam pin 34 is inserted. Cam pin 34 is fixed to an operating shaft 35. Operating shaft 35 projects at the upper end thereof outwardly from the housing, and is fixed with a by-pass lever 23. Therefore, when the vehicle is hauled, the by-pass lever 23 can be rotated, biasing by-pass operating member 22 through cam pin 34, so as to press push pins 33 and open check valves C. Thereby, the closed circuit is open in the housing, enabling hydraulic motor M to freely rotate.

Figure 3:
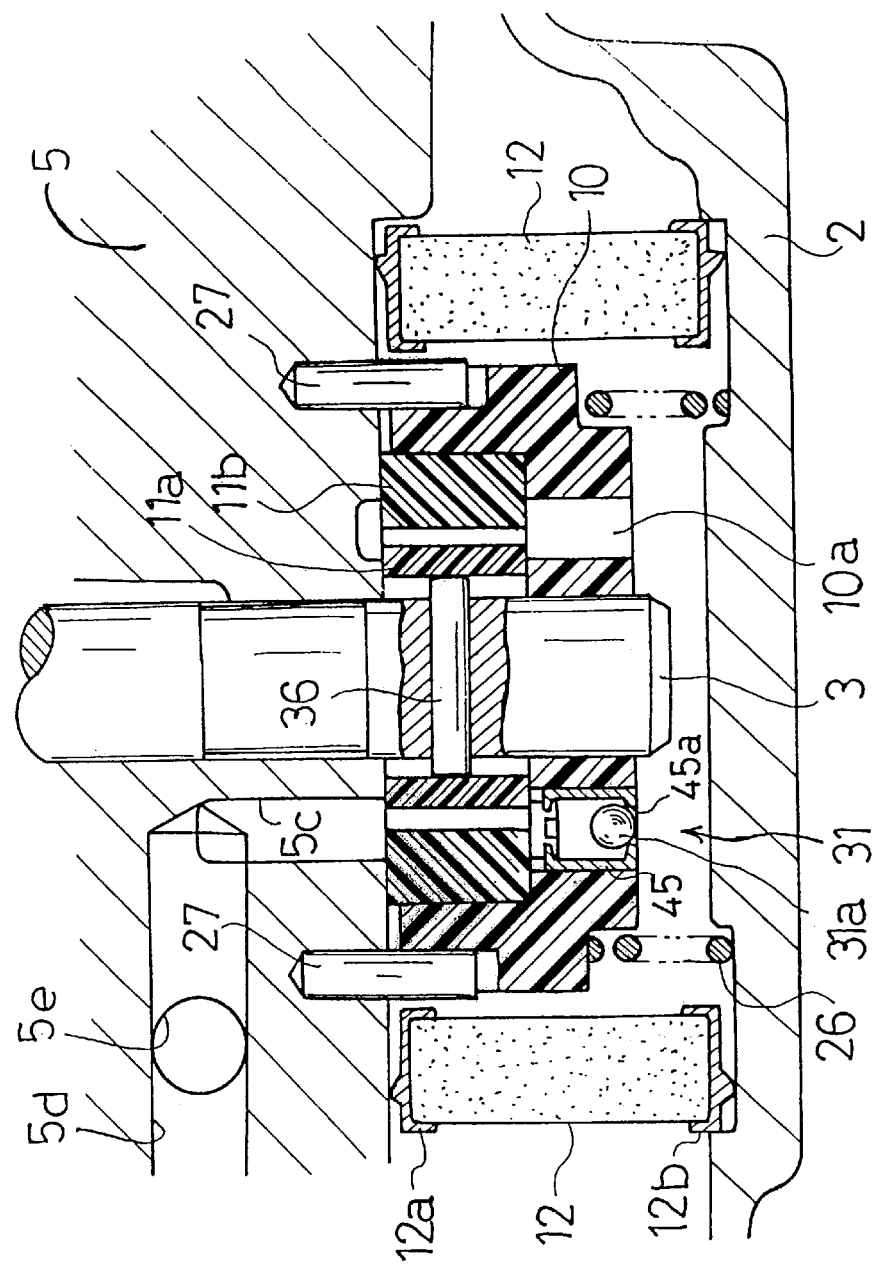
FIG. 3 is an enlarged cross-sectional side view of the principal portion of the invention, showing the charge pump mounting area.

A pump casing 10 is attached to the lower horizontal surface of center section 5, as shown in FIGS. 1 and 3. Pump casing 10 houses a charge pump 11 for supplying oil into the closed circuit through operating oil supply port 5c. Charge pump 11 may be a gear pump of circumscribed shape or inscribed shape. In the embodiment shown, first and second toothed wheels are constructed as inner and outer rotors, 11a and 11b respectively, of inscribed shape.

Inner and outer rotors 11a and 11b are provided with teeth having a trocoid curve and an involute curve and are housed in pump casing 10, whereby inner rotor 11a engages with outer rotor 11b. Outer rotor 11b is rotatably guided at the outer periphery thereof through the inner periphery of pump casing 10. Inner rotor 11a is axially slidably but not-relative-rotatably presented on the lower end of input shaft 3, which projects from the lower horizontal surface of center section 5. The axis of rotation of charge pump 11 extends vertically. Charge pump 11 is driven by input shaft 3. At one side of the engagement of inner rotor 11a with outer rotor 11b, a suction port is formed and at the other side, a discharge port is formed. The charge pump is not limited to the above-mentioned gear pump, but may be of trocoid type or vane type.

Pump casing 10 is conventionally molded of sintered metal, but in the present invention, in order to reduce the weight of the pump casing, at least one, two, or all three of the elements (the charge pump, the first toothed wheel, and the second toothed wheel) are molded of heat resistant synthetic resin (or engineering plastic). One of the most suitable materials for molding the above-mentioned members is thermosetting resin, an example of which is any resin in the family of epoxy, melamine, phenol, urea, polyether, polyimide, unsaturated polyester, polyamideimide or the like.

Among thermoplastic resins, there are resins resistant to a high temperature of 100° C. or more and are not-deformable. An example of such is any resin in the family of polyphenylene sulfide, polyamide, polycarbonate, polyacetals or the like. These materials may also be used for molding the charge pump.

Furthermore, to enable rotors 11a and 11b to have improved wear resistance, when in contact with pump casing 10 and the lower horizontal surface of center section 5, portions of pump casing 10, composed of the above-mentioned heat resistant resin, which are in slidable contact with inner rotor 11a and outer rotor 11b, are applied with metal films, or metal coating. Alternatively, the surfaces of inner rotor 11a and outer rotor 11b which slidably contact with pump casing 10 may have metal films or the like applied thereto.

A spring 26 composed of heat resistant resin is interposed between the lower surface of pump casing 10, and the inner bottom surface of lower half casing 2. Spring 26 biases pump casing 10 toward the lower horizontal surface of center section 5 so as to specify the pump discharge pressure of charge pump 11. In other words, when the pressure of oil discharged from charge pump 11 exceeds the value corresponding to the biasing force (of specified value) of spring 26, pump casing 10, together with inner rotor 11a and outer rotor 11b, moves downward along the axis of rotation of input shaft 3 and separates from the lower horizontal surface of center section 5, thereby temporarily disconnecting the discharge port of charge pump 11 from operating oil supply port 5c. Hence, the pressurized oil having a pressure over the specified value is discharged into the oil sump in the housing, providing the function of a charge relief valve for pump casing 10.

Additionally, charge pump 11 is reduced in weight by forming the pump casing 10 of resin different from conventional metal. Pump casing 10 is reduced in weight to increase its damping in order to stabilize the relief performance. Also, by applying metal films on the surfaces of inner rotor 11a and outer rotor 11b, which rotate in contact with the lower horizontal surface of center section 5, wear at the slidable contact portions of both rotors 11a and 11b is decreased, enabling the charge pump 11 and center section 5 to have prolonged life spans.

Projecting downwardly from the lower horizontal surface of center section 5 are a plurality of guide pins 27. Recesses into which the guide pins 27 can be fitted are formed on the periphery of the surface of pump casing 10, so that when pump casing 10 moves along input shaft 3, guide pins 27, which are not relatively rotatable, guide pump casing 10. This prevents the communication between the discharge port and the operating oil supply port 5c from shifting.

An oil filter 12 is interposed between the lower horizontal surface of center section 5 and the inner bottom surface of lower half casing 2, so as to surround pump casing 10. In detail, oil filter 12 is molded of a porous material and formed annularly, so as to be large enough to cover the entire pump casing 10. Both the upper and lower annular edges of oil filter 12 are covered by sealing members, 12a and 12b respectively. One sealing member 12a is brought into close contact with the lower horizontal surface of center section 5. The other sealing member 12b is brought into close contact with the inner bottom surface of lower half casing 2, so that oil filter 12 separates the interior thereof from the exterior.

Figure 4:
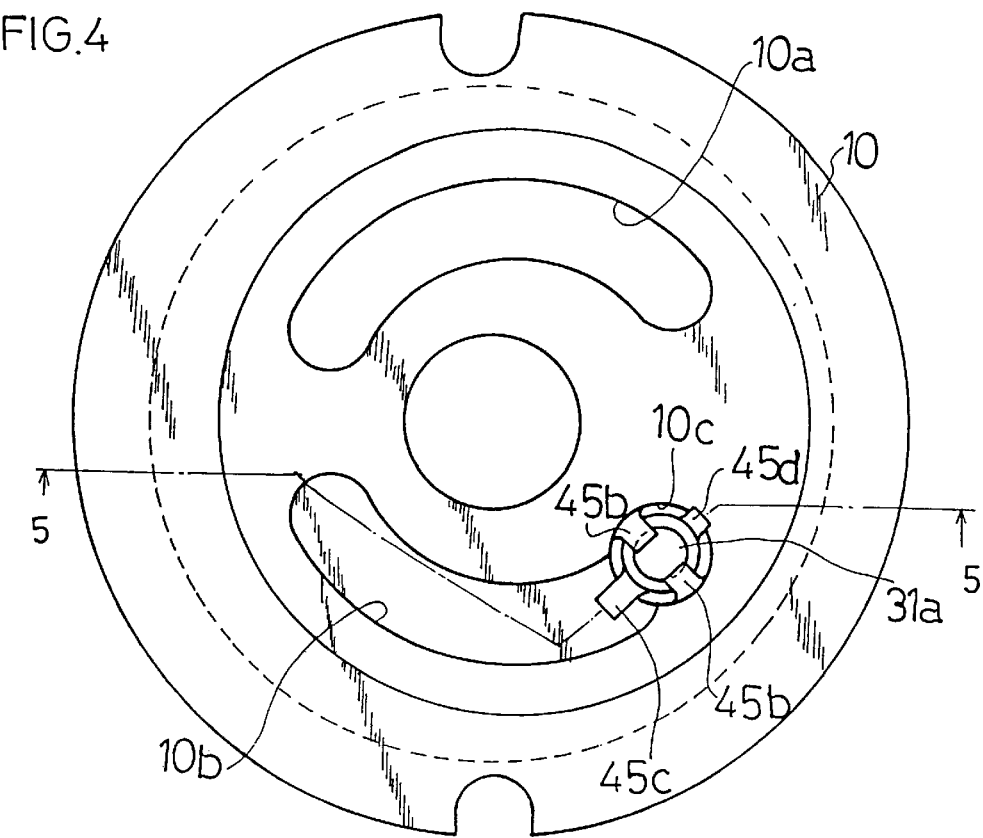
FIG. 4 is a plan view of the pump casing, on which a check valve is mounted.
Figure 5:
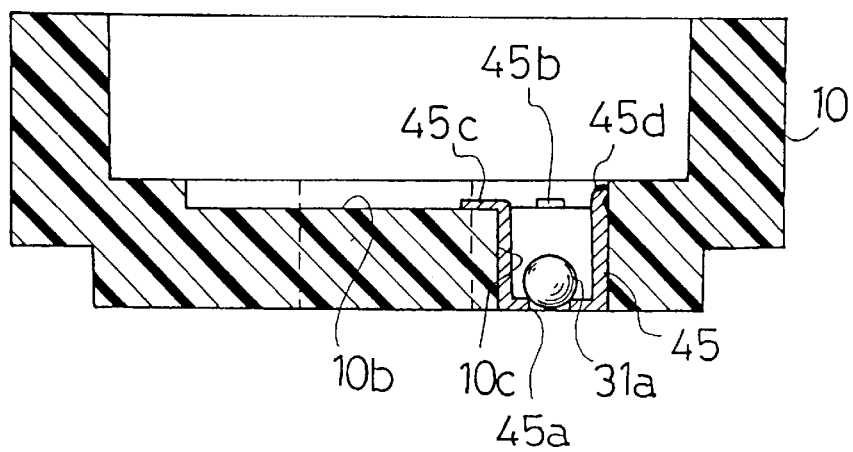
FIG. 5 is a cross-sectional view looking in the direction of the arrows in FIG. 4.
Figure 6:
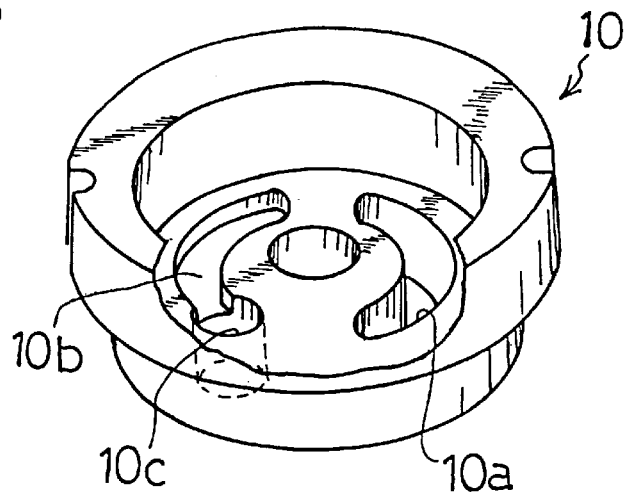
FIG. 6 is a perspective view of the pump casing.

At the pump casing 10, as shown in FIGS. 4, 5, and 6, a suction port 10a and a kidney-type groove 10b communicate with the discharge port. The discharge port communicates with operating oil supply port 5c, provided at the lower horizontal surface of center section 5, which supplies oil to the closed circuit. An oil bore 10c is open at the lower surface of pump casing 10 and communicates with groove 10b. A tubular member 45, with a steel ball 31a therein, is inserted from above into oil bore 10c, thereby constituting a check valve 31.

Figure 7:
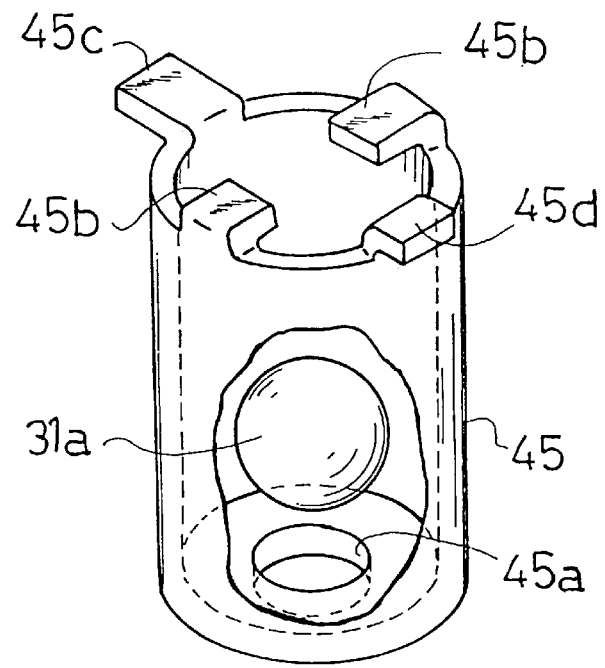
FIG. 7 is a perspective view of the check valve.
Figure 8:
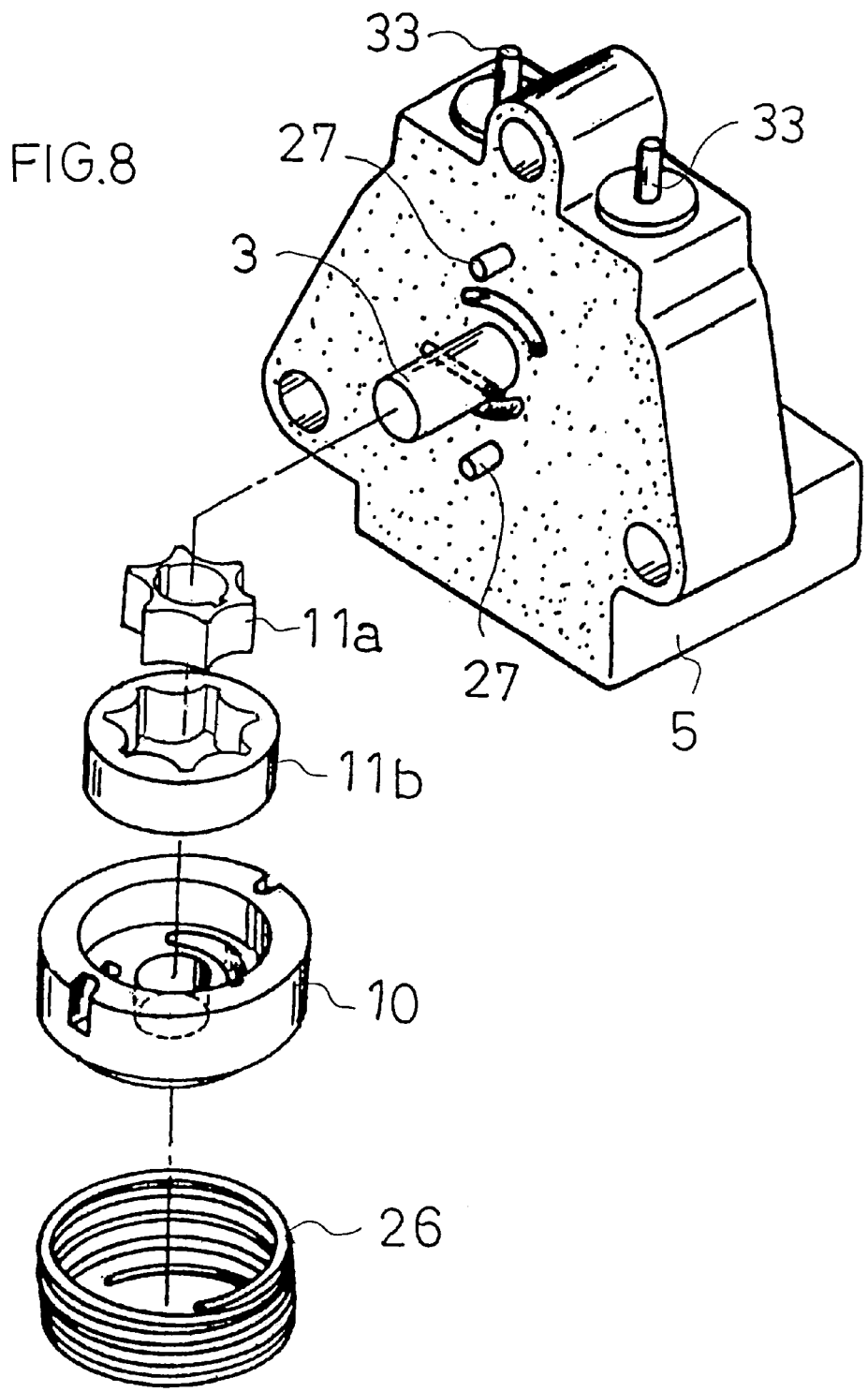
FIG. 8 is an exploded perspective view of the charge pump.

Tubular member 45, as shown in FIG. 7, is cylindrical with a closed bottom. At the center of the bottom of the tubular member 45, a bore 45a communicates between the oil sump in which oil filter 12 is positioned and groove 10b. The inner peripheral edge of bore 45a forms a seat surface for steel ball 31a. The periphery of the upper opening of tubular member 45 is provided with at least three projections, disposed at three positions and extending radially from the top of tubular member 45. In the embodiment shown, four projections 45b (there are two), 45c and 45d are provided at four positions. The two projections 45b are bent radially inwardly from tubular member 45 so as to prevent steel ball 31a from escaping therefrom. Projection 45c is bent radially outwardly from tubular member 45 and is retained by the groove 10b in pump casing 10, thereby preventing tubular member 45 from escaping from oil bore 10c when subjected to the discharge pressure of charge pump 11. Projection 45d is bent radially outwardly from tubular member 45 and is retained by the inner peripheral surface of oil bore 10c, thereby preventing tubular member 45 from escaping from oil bore 10c toward inner rotor 11a and outer rotor 11b. Alternatively, instead of projections 45b, 45c and 45d, cylindrical member 45 may be deformed, in part, at the peripheral edge of the upper opening into bill-like shapes.

Figure 9:
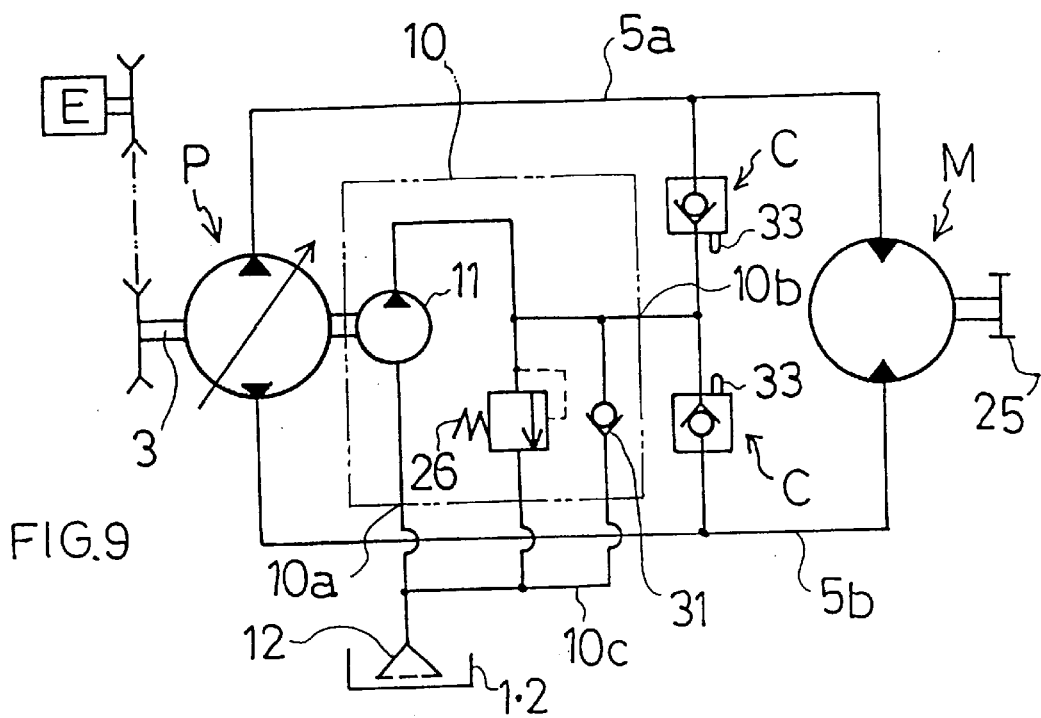
FIG. 9 is a hydraulic circuit diagram.

As shown in FIG. 9, in the axle driving apparatus as constructed as mentioned above, input shaft 3 is rotated by engine power when engine E operates. Hydraulic pump P is driven and simultaneously charge pump 11 is driven. Movable swash plate 8 is manually slantwise operated from the neutral position, whereby the pressurized oil corresponding to the slanting direction and a slanting angle of swash plate 8 is sent to hydraulic motor M, and the rotating direction and the number of rotations are changed, thereby driving the axles (not shown) by motor shaft 4. Simultaneously, as the operating oil circulating between hydraulic pump P and hydraulic motor M in center section 5 decreases, the oil stored in the housing is forcibly supplied by charge pump 11 into the closed circuit.

When movable swash plate 8 is put in the neutral position to stop engine E, the operating oil in the closed circuit of center section 5 is prevented from circulating and charge pump 11 also stops, so as to not supply operating oil into the closed circuit. Thus, when the vehicle stops on a slope and hydraulic motor M is subjected to a rotational load on the wheels forcing them to move the vehicle down the slope, hydraulic motor M acts as a pump generating pressure in the closed circuit. As time goes by, oil in the closed circuit leaks through the slidable portions at the outer peripheries of pistons 13 and 14 contained in cylinder blocks 16 and 17 of hydraulic pump P and hydraulic motor M. When negative pressure is generated in the closed circuit, steel ball 31a in check valve 31 floats up due to the negative pressure, and oil bore 45a of cylindrical member 45 is opened. Pure operating oil, filtered by oil filter 12, is thereby supplied from the oil sump in the housing and passes through check valve 31, the discharge port of charge pump 11, operating oil supply port 5c, and oil passages 5d and 5e. Then one of the check valves C at the low pressure side is opened and the leaked oil is supplied into the closed circuit, so that the closed circuit is always filled with operating oil. As a result, hydraulic motor M becomes not-rotatable and the vehicle is prevented from rolling down the slope.

Figure 10:
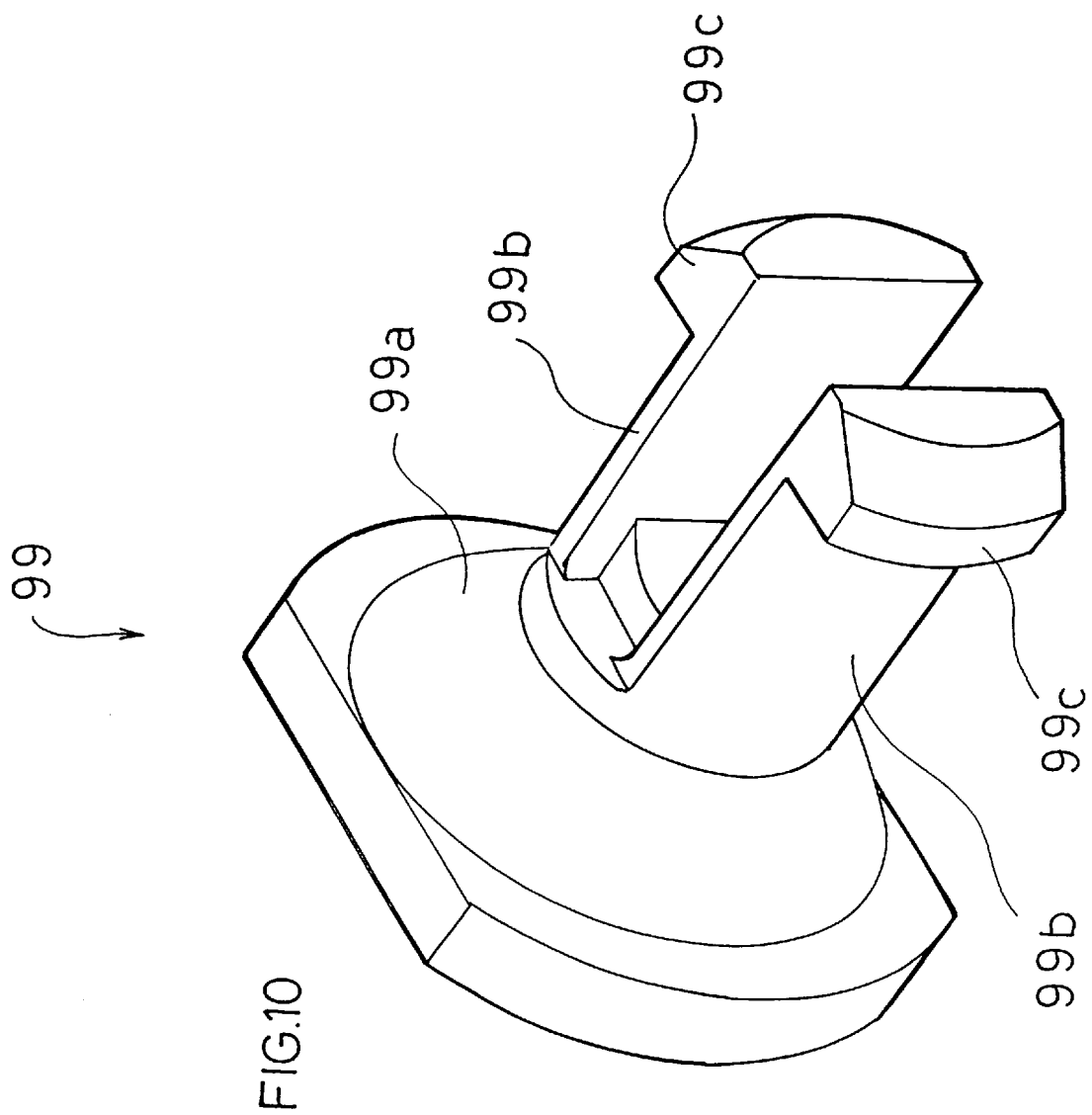
FIG. 10 is a perspective view of an alternate embodiment of the check valve.

In an alternate embodiment of the invention, check valve 31 consisting of tubular member 45 and steel ball 31a is replaced with a single body valve 99. Except as described below, all other parts of the invention are the same as shown in FIGS. 1–9. As shown in FIG. 10, single body valve 99 consists of a trapezoidal cone portion 99a, a plurality of restraining legs 99b and a plurality of projections 99c which projects radially. Restraining legs 99b project from the narrower side of trapezoidal cone portion 99a in the direction in which the cone narrows. Restraining legs 99b are made of a material such as synthetic resin so that they are sufficiently elastic to allow the legs to bend in toward each other. On utmost end of each restraining leg 99b is a projection 99c. Projections 99c extend beyond the perimeter of restraining leg 99b and are beveled in the direction in which the cone narrows so as to guide installation, but restrict displacement, of single body valve 99 as described below.

In this alternate embodiment of the invention, oil bore 10c is bored at a plurality of diameters to correspond with the respective diameters of trapezoidal cone portion 99a, restraining legs 99b, and projections 99c. As such oil bore 10c is divided into a matching conic section 10c(a) to correspond with trapezoidal cone portion 99a, a middle narrow section 10c(b) to correspond with restraining legs 99b, and an end wide section 10c(c) to correspond with projections 99c. Where middle narrow section 10c(b) meets end wide section 10c(c), a horizontal edge 10d is formed on the wall of oil bore 10c.

Figure 11:
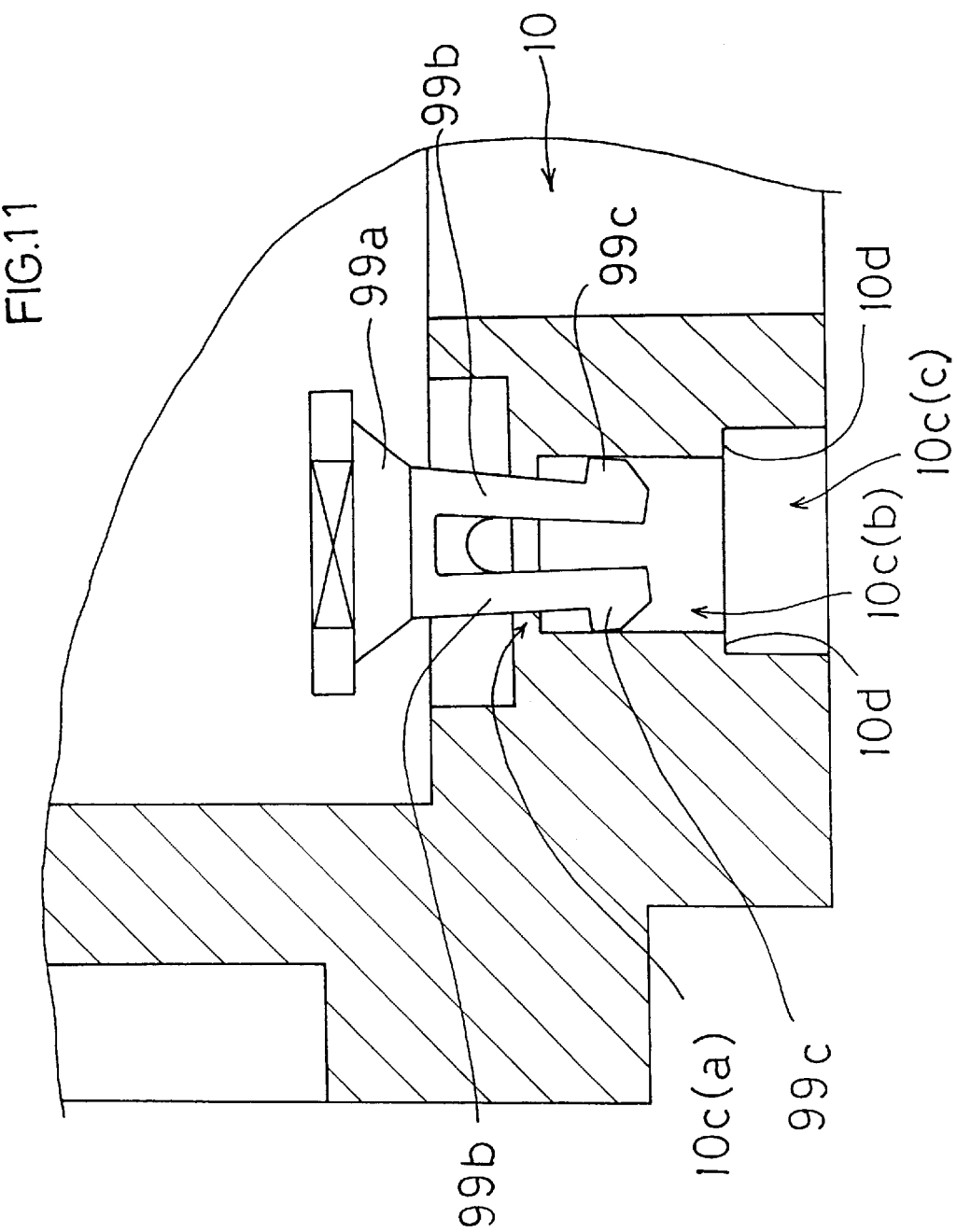
FIG. 11 is an enlarged partial cross-sectional side view of the pump casing showing the alternate embodiment of the check valve during installation.
Figure 12:
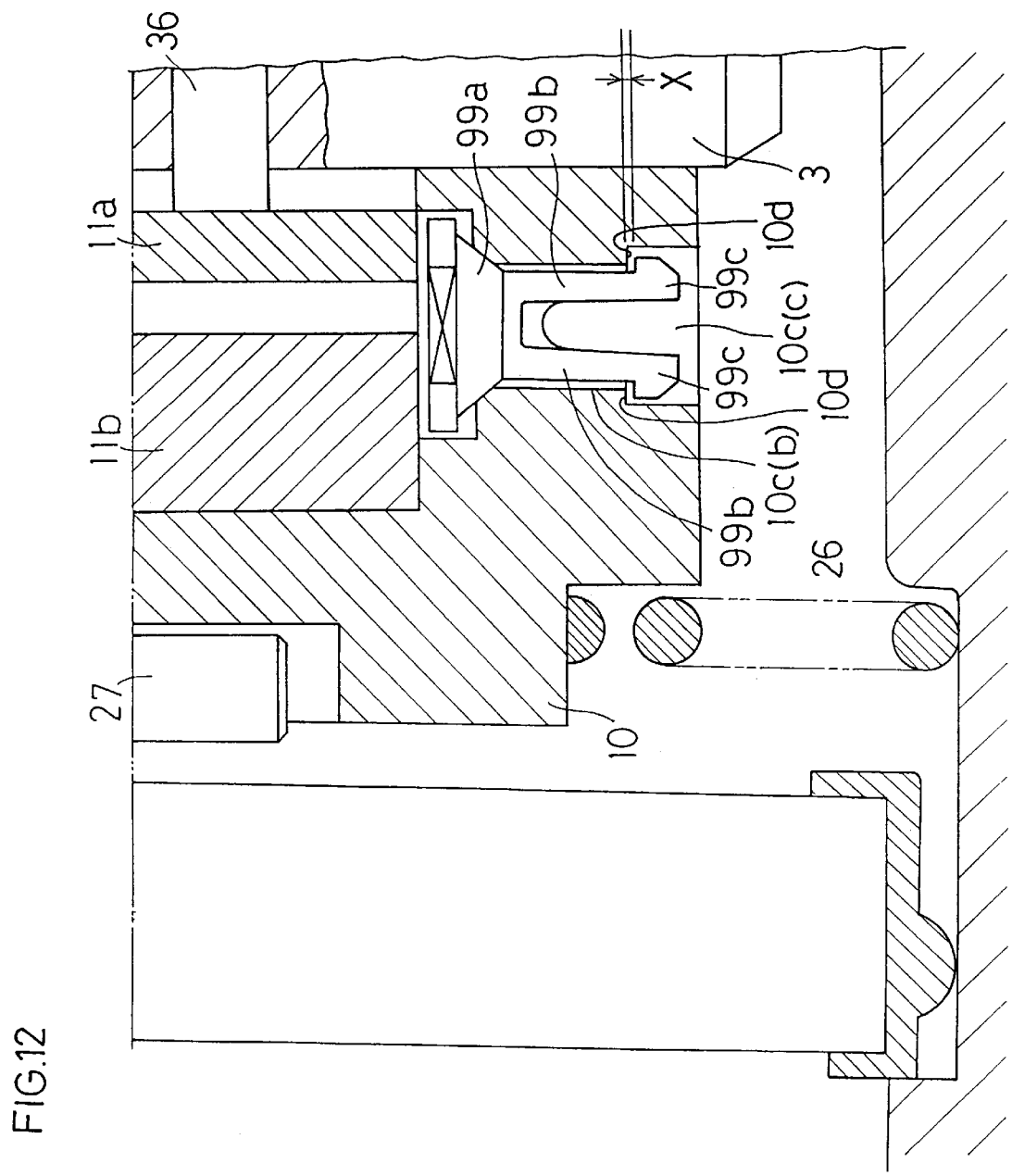
FIG. 12 is an enlarged partial cross-sectional side view of the pump casing showing the alternate embodiment of the check valve in the closed position.

As shown in FIGS. 11 & 12, single body valve 99 is pushed into pump casing 10 by inserting the restraining legs 99b into the oil bore 10c from charge pump 11 side. As this is done, the beveled edges of projections 99c contact the circuit surface of oil bore 10c and force restraining legs 99b to bend inward, as seen in FIG. 11. When projections 99c clear middle narrow section 10c(b) of oil bore 10c, projections 99c project outward by the elastic power of restraining legs 99b. In this manner, projections 99c extend past horizontal edge 10d in oil bore 10c, thereby preventing single body valve 99 from slipping out of pump casing 10, as seen in FIG. 12.

FIG. 12 shows single body valve 99 in the closed position. When discharging pressure of charge pump 11 operates on an upper surface of single body valve 99, the force pushes trapezoidal cone portion 99a into matching conic section 10c(a) so as to block oil in the closed circuit of the HST from flowing through oil bore 10c into the oil sump. In this position, a first space X is created between projections 99c and horizontal edge 10d.

Figure 13:
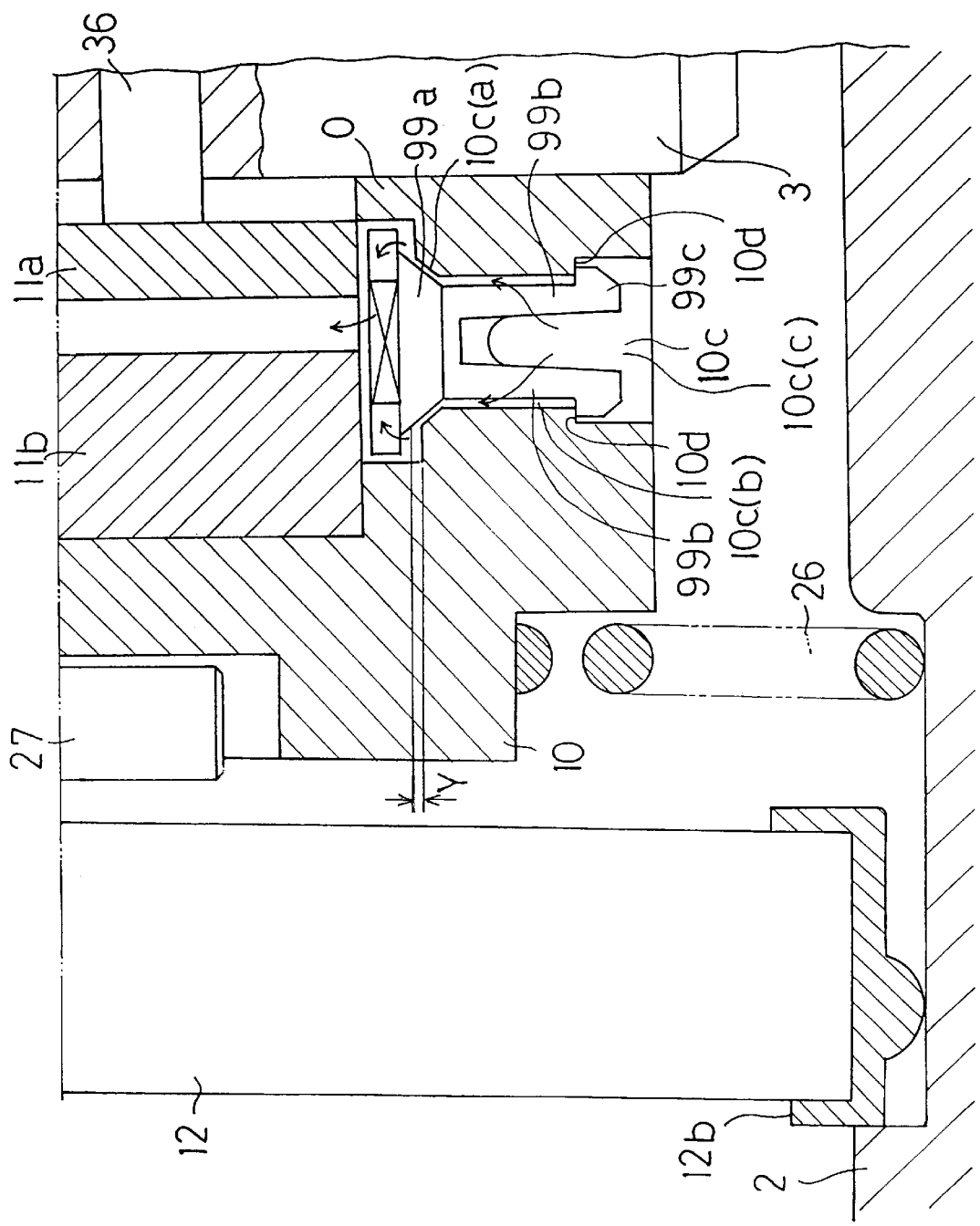
FIG. 13 is an enlarged partial cross-sectional side view of the pump casing showing the alternate embodiment of the check valve in the open position.

FIG. 13 shows single body valve 99 in the open position. When negative pressure is generated at the discharging side on stopping charge pump 11 (as described above), single body valve 99 is lifted into the open position. In this condition, first space X closes so that blocking arms 99c abut horizontal edge 10d, thereby holding single body valve 99 in place in pump casing 10. As a result, a second space Y opens between trapezoidal cone portion 99a and matching cone portion 10c(a) of oil bore 10c. Oil can thus be pumped by charge pump 11 from the oil sump up between restraining legs 99b around to the outer sides of restraining legs 99b and through space Y into the closed circuit of the HST.

Under the first described embodiment of the invention shown in FIGS. 1–9, the check valve parts need to be processed to specifications in a complicated form. In the alternate embodiment of the invention, shown in FIGS. 10–13, only one piece is required to create the check valve, thereby simplifying installation and reducing the cost of production and replacement.

Both single body valve 99 and pump casing 10 may be molded of resin material. Preferably, the resin material of single body valve 99 is softer than that of pump casing 10. For example, single body valve 99 is molded of heat resistant nylon and pump casing 10 is molded of phenol resin.

While the preferred embodiments of the invention have been described using specific terms, such descriptions are for illustrative purpose only, and it is to be understood that changes and variations may be made without departing from the spirit or scope of the following claims.

What is claimed is:

1. A hydrostatic transmission, comprising:

a housing;

an oil sump formed in said housing;

a hydrostatic transmission disposed in said housing, including a hydraulic pump, a hydraulic motor, and a center section, on which said hydraulic pump and said hydraulic motor are disposed, wherein said center section includes a closed circuit for circulating operating oil between said hydraulic pump and said hydraulic motor and a supply port on a surface of said center section for supplying oil to said closed circuit;

a power input shaft supported by said housing, for driving said hydraulic pump;

a charge pump disposed in said oil sump driven by said power input shaft for sucking in oil from said oil sump and discharging said oil to said supply port of said center section;

a suction port for said charge pump fluidly connecting said charge pump to said oil sump;

an oil bore formed at a pump casing of said charge pump for opening a discharge port of said charge pump within said oil sump; and a check valve disposed in said oil bore so as to allow said oil from said oil sump to flow only into said supply port of said center section through said discharge port of said charge pump.

2. A hydrostatic transmission according to claim 1, wherein said check valve is a single body and is molded of elastic material.

3. A hydrostatic transmission according to claim 2, wherein said check valve and said pump casing are molded of resin material.

4. A hydrostatic transmission according to claim 3, wherein said resin material of said check valve is softer than said resin material of said pump casing.

5. A hydrostatic transmission according to claim 1, wherein said oil bore includes an oil passage section, a valve seat disposed at one side of said oil passage section and a recess section disposed at another side of said oil passage, and said check valve comprises a poppet valve portion to correspond with said valve seat, a leg extending from a base of said poppet valve portion to be inserted through said oil passage section and a projection radially projecting from an utmost end of said leg to be engaged with said recess section, wherein said oil passage section is shorter than said leg.

6. A hydrostatic transmission according to claim 5, wherein said check valve is a single valve and is molded of elastic material so as to enable said leg to bend.

7. A hydrostatic transmission according to claim 6, wherein said check valve and said pump casing are molded of resin material.

8. A hydrostatic transmission according to claim 7, wherein said resin material of said check valve is softer than said resin material of said pump casing.

9. A hydrostatic transmission, comprising:

a housing;

an oil sump formed in said housing;

a hydrostatic transmission disposed in said housing, including a hydraulic pump, a hydraulic motor, and a center section, on which said hydraulic pump and said hydraulic motor are disposed, wherein said center section includes a closed circuit for circulating operating oil between said hydraulic pump and said hydraulic motor and a supply port on a surface of said center section for supplying oil to said closed circuit;

a power input shaft supported by said housing, for driving said hydraulic pump;

a charge pump disposed in said oil sump driven by said power input shaft for sucking in oil from said oil sump and discharging said oil to said supply port of said center section;

an oil filter disposed in said oil sump;

a suction port for said charge pump open adjacent to said oil filter;

an oil bore formed at a pump casing of said charge pump for opening said discharge port of said charge pump within said oil filter; and a check valve disposed in said oil bore so as to allow said oil from said oil filter to flow only into said supply port of said center section, wherein said check valve is a single body and is molded of elastic material.

10. A hydrostatic transmission according to claim 9, wherein said check valve and said pump casing are molded of resin material.

11. A hydrostatic transmission according to claim 10, wherein said resin material of said check valve is softer than said resin material of said pump casing.

12. A hydrostatic transmission, comprising:

a housing;

an oil sump formed in said housing;

a hydrostatic transmission disposed in said housing, including a hydraulic pump, a hydraulic motor, and a center section, on which said hydraulic pump and said hydraulic motor are disposed, wherein said center section includes a closed circuit for circulating operating oil between said hydraulic pump and said hydraulic motor and a supply port on a surface of said center section for supplying oil to said closed circuit;

a power input shaft supported by said housing, for driving said hydraulic pump;

a charge pump disposed in said oil sump driven by said power input shaft for sucking in oil from said oil sump and discharging said oil to said supply port of said center section;

an oil filter disposed in said oil sump;

a suction port for said charge pump open adjacent to said oil filter;

an oil bore formed at a pump casing of said charge pump for opening said discharge port of said charge pump within said oil filter; and a check valve disposed in said oil bore so as to allow said oil from said oil filter to flow only into said supply port of said center section;

wherein said oil bore includes an oil passage section, a valve seat disposed at one side of said oil passage section and a recess section disposed at another side of said oil passage, and said check valve comprises a poppet valve portion to correspond with said valve seat, a leg extending from a base of said poppet valve portion to be inserted through said oil passage section and a projection radially projecting from an utmost end of said leg to be engaged with said recess section, wherein said oil passage section is shorter than said leg.

13. A hydrostatic transmission according to claim 12, wherein said check valve is a single valve and is molded of elastic material so as to enable said leg to bend.

14. A hydrostatic transmission according to claim 13, wherein said check valve and said pump casing are molded of resin material.

15. A hydrostatic transmission according to claim 13, wherein said resin material of said check valve is softer than said resin material of said pump casing.

* * * * *